(12) United States Patent
Russo et al.

(10) Patent No.: US 10,320,744 B2
(45) Date of Patent: Jun. 11, 2019

(54) SYSTEMS, DEVICES, AND METHODS FOR DYNAMIC ALLOCATION OF DOMAIN NAME ACQUISITION RESOURCES

(71) Applicant: VERISIGN, INC., Reston, VA (US)

(72) Inventors: Vincenzo Russo, Belp (CH); Joseph Waldron, Herndon, VA (US); Ashvatth Lakshmanan, Alrington, VA (US)

(73) Assignee: VERISIGN, INC., Reston, VA (US)

( * ) Notice: Subject to any disclaimer, the term of this patent is extended or adjusted under 35 U.S.C. 154(b) by 440 days.

(21) Appl. No.: 15/047,435

(22) Filed: Feb. 18, 2016

(65) Prior Publication Data

US 2017/0244668 A1 Aug. 24, 2017

(51) Int. Cl.
  *G06F 15/16* (2006.01)
  *H04L 29/12* (2006.01)
(52) U.S. Cl.
  CPC ...... *H04L 61/3025* (2013.01); *H04L 61/1511* (2013.01); *H04L 61/302* (2013.01)
(58) Field of Classification Search
  USPC ................. 709/245, 223, 244, 220
  See application file for complete search history.

(56) References Cited

U.S. PATENT DOCUMENTS

2002/0091703 A1 7/2002 Bayles
2004/0172463 A1 9/2004 King et al.

FOREIGN PATENT DOCUMENTS

WO 2008/031215 A1 3/2008

OTHER PUBLICATIONS

Extended European Search Report dated Jun. 1, 2017, European Application No. 17156725.8, pp. 1-6.

*Primary Examiner* — Lan Dai T Truong
(74) *Attorney, Agent, or Firm* — MH2 Technology Law Group, LLP

(57) ABSTRACT

Embodiments relate to systems, devices, and computing-implemented methods for dynamically allocating domain name acquisition resources by receiving indications of available domain name acquisition resources and available time windows from registrars, receiving, from devices, requests for available domain name acquisition resources during requested time windows, determining lists of domain name acquisition resources available during the requested time window, transmitting, to the devices, the lists of available domain name acquisition resources, receiving, from the devices, selections of the available domain name acquisition resources, specified time windows, and indications of domain names to request during the specified time windows, generating and transmitting communications to the registrars, where the communications result in the registrars sending a plurality of requests for the domain names to a domain name registry during the specified time windows.

21 Claims, 6 Drawing Sheets

DOMAIN NAME ACQUISITION RESOURCE EXCHANGE

| NAME | CHANNELS | BANDWIDTH (MBPS) | PRICE (PER MIN) |
|---|---|---|---|
| REGISTRAR 1 | 4 | 1 | $100 |
| REGISTRAR 2 | 2 | 0.95 | $85 |
| REGISTRAR 3 | 2 | 1.2 | $150 |
| REGISTRAR 4 | 2 | 0.8 | $50 |
| REGISTRAR 5 | 4 | 1 | $100 |
| REGISTRAR 6 | 4 | 0.90 | $85 |
| REGISTRAR 7 | 3 | 1.1 | $99 |
| REGISTRAR 8 | 2 | 0.8 | $75 |

DATE: 1/14/16
START TIME: 2:09 PM
END TIME: 2:11 PM
NUMBER OF CHANNELS: 20
MAX PRICE (PER MIN): $150

FIG. 5

SYSTEMS, DEVICES, AND METHODS FOR DYNAMIC ALLOCATION OF DOMAIN NAME ACQUISITION RESOURCES

BACKGROUND

The Domain Name System (DNS) allows systems to connect with each other to communicate by associating domain names with numerical addresses. These associations between domain names and numerical addresses (e.g., internet protocol (IP) addresses) can be stored (e.g., as a domain name record) in a dynamic global database (i.e., a domain name registry) for use as part of the Internet.

A domain name registry is tasked with maintaining an up-to-date database of domain name records, and, accordingly, a domain name registry is constantly updated by adding newly reserved domain names as new domain name records and deleting non-renewed domain name records. For example, domain name records can be deleted when the owner of the domain name does not want the domain name any more and/or fails to renew the registration on time.

In some instances, deleting domain name records can occur as part of a batch delete at regular intervals (e.g., once per day). Additionally, because a large domain name registry could delete hundreds of thousands of domain name records in a single batch delete, the processing time of the batch delete can take a non-negligible amount of time (e.g. several seconds or even minutes). In other words, even if two domain name records were included in a batch delete, the domain name records may be deleted at significantly different times. Once the domain name record is deleted, the associated domain name is available to be reserved by a new party. Often, domain names records that are deleted may be for domain names that are desired by one or more new parties.

Domain names are typically reserved (registered) by domain name registrars, which are accredited by the domain name registry. Some domain name registrars offer a service of registering newly deleted domain name. In order to re-register a newly deleted domain name, the domain name registrar can send add requests to the domain name registry around the time that the batch delete occurs. Add requests that are received prior to the record being deleted or after another party has already re-registered the domain name will fail. Only one add request that occurs after the record is deleted and before any other add requests occur will succeed. Accordingly, in some instances, a domain name desired by a large number of parties may only be deleted for milliseconds prior to being re-registered by a new party.

In certain embodiments, in order to limit the number of add requests and provide equal opportunity to the registrars, each registrar is provided with a limited number of resources (e.g., channels) to use for add requests. However, a single entity can control multiple registrars and, thus, can gain an advantage over other entities that control fewer registrars.

Additionally, registrars may have resources that are being unused during a particular deletion period and/or during particular time windows during a batch delete period. For example, a registrar may be scheduled to use a resource for the first 500 milliseconds of a batch delete period, but may not be scheduled to use the resource for the remainder of the batch delete period.

Therefore, there is a desire for systems and methods that provide for dynamic allocation of domain name acquisition resources during a batch deletion period.

SUMMARY

The present disclosure relates to systems, devices, computer readable storage medium and methods for dynamically allocating domain name acquisition resources by receiving an indication of an available domain name acquisition resource and an available time window from a registrar, receiving, from a device, a request for available domain name acquisition resources during a requested time window, where the requested time window is within the available time window, determining a list of domain name acquisition resources available during the requested time window, where the list includes the available domain name acquisition resource, transmitting, to the device, the list of available domain name acquisition resources, receiving, from the device, a selection of the available domain name acquisition resource, a specified time window within the available time window, and an indication of a domain name to request during the specified time window, generating a communication that includes an indication of the domain name to request during the specified time window; and transmitting the communication to the registrar, where the communication results in the registrar sending a plurality of requests for the domain name to a domain name registry during the specified time window.

In some embodiments, the specified time window can be during a batch delete period of a domain name registry.

In further embodiments, the indication of the available domain name acquisition resource and the available time window can include indications of one or more of a name of the registrar, a number of domain name acquisition resources available, an available bandwidth for requesting domain names, and a price for requesting domain names.

In other embodiments, the request for available domain name acquisition resources can be received via a web interface.

In some implementations, the device can be multiple devices, each device can provide a selection of a domain name acquisition resource, a specified time window, and an indication of a domain name to request during the specified time window; and the communication can include a multiple indications of domain names to request, each domain name associated with a specified time window.

In further implementations, the registrar can be multiple registrars, the communication can be multiple communications; and transmitting the communication to the registrar includes transmitting each communication to a registrar.

In some embodiments, the communication can include a schedule of domain names to request based on the specified time windows.

In further embodiments, the communication can include a file that causes the registrar to automatically send repeated add requests for a domain name, based on the schedule of domain names, to the domain name registry.

In other embodiments, the file can cause the registrar to begin requesting a subsequent domain name in the schedule based on at least one of capturing the previous domain name in the schedule or a time window for the previous domain name ending.

In some implementations, the indication of the available domain name acquisition resource and the available time window from the registrar can be received via a domain name acquisition resource allocation program running on the registrar, and the domain name acquisition resource allocation program can be associated with a domain name acquisition resource allocation service.

In further implementations, the domain name acquisition resource allocation service can be associated with the domain name registry

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 5 is a diagram illustrating an example interface for allocating domain name acquisition resources, consistent with certain disclosed embodiments.

DETAILED DESCRIPTION

Figure 1:
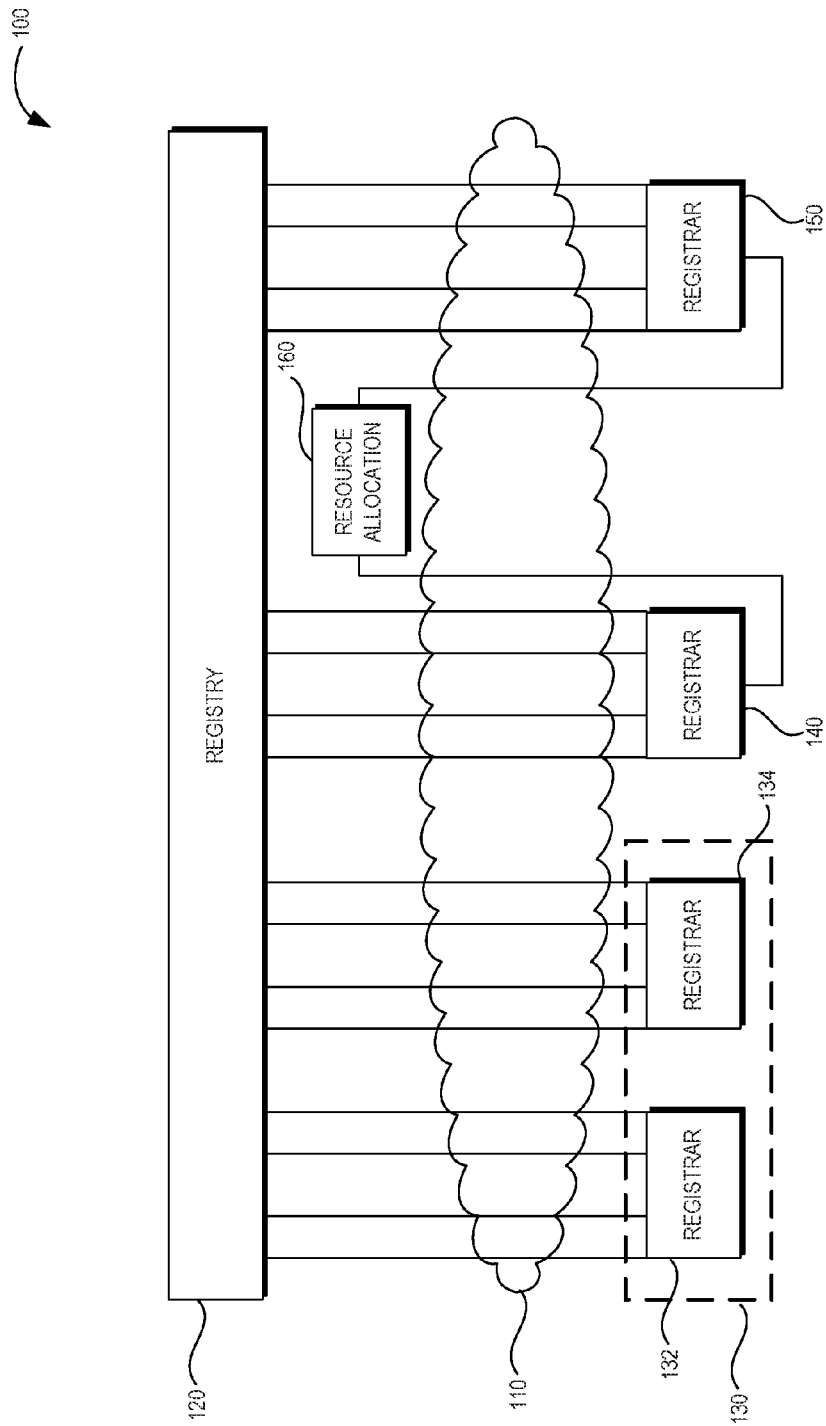
FIG. 1 is a diagram illustrating an example DNS during a batch delete period, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In some embodiments, a domain name registry can batch delete expiring domain name records at regular intervals (e.g., once per day). Additionally, prior to the batch delete, the domain name registry can provide a list of domain names that are associated with records that will be deleted. In some implementations, the list of domain names can be listed in the order that each will be deleted. Accordingly, if the processing time of the batch delete takes a non-negligible amount of time (e.g., several seconds or minutes) the actual deletion time of each individual record can be estimated within minutes, seconds, milliseconds, etc. For example, a domain name at the beginning of the list may be deleted within the first seconds or milliseconds of the batch delete. Based on an average deletion time per record (e.g. in milliseconds) the deletion time of domain names further down the list can also be estimated.

Registrars attempting to capture an expiring domain name can attempt to repeatedly send add requests to the domain name registry around the estimated deletion time of the desired domain name. The first registrar to submit the add request that is received by the registry after the record is deleted can capture the domain name.

In various embodiments, the registrars will be accredited with, for example, the domain name registry and/or with the Internet Corporation for Assigned Names and Numbers (ICANN), and, based on the accreditation, the registrar can be allotted a limited number of domain name acquisition resources to use for the add request (e.g., four channels), and each resource may only be able to send one add request at a time.

In some instances, certain entities may control multiple accredited registrars, allowing the entity to pool the resources of multiple registrars towards capturing a domain name to allow for more simultaneous add requests for the domain name.

Additionally, in further instances, certain registrars may have resources that will not be used during a particular batch delete period or during one or more time windows of the batch delete period. For example, the registrar may not identify any desirable domain names during the deletion period or the one or more time windows, may not have any customers lined up to purchase the soon-to-be available domain names during the deletion period or the one or more time windows, etc. Therefore, there are potentially unused and, thus, available resources that can be used by other registrars.

Current processes of obtaining domain names during a batch delete period do not have the technical ability to allocate available resources, and such inefficient and/or non-existent resource allocation can lead to waste of the available resources. This is a significant technical problem of the current processes because some registrars (or the entities that control them) may not have enough available resources to obtain desirable domain names while resources of other registrars are wasted.

Accordingly, in some embodiments, entities (e.g., entities that control fewer registrars) can utilize a resource allocation service in order to engage available resources of other registrars during time windows within the batch delete period. Thus, by using the available resources of other registrars, entities that control fewer registrars have an increased chance of obtaining desirable domain names during a batch delete period. Various embodiments described herein and consistent with the present invention solve these technical problems, among others.

FIG. 1 is a diagram illustrating an example DNS during a batch delete period, consistent with certain disclosed embodiments. In some embodiments, DNS 100 can include network 110, registry 120, registrar 132 and registrar 134 (associated with a single entity represented by box 130), registrar 140, registrar 150, and resource allocation server 160.

In some embodiments, network 110 can represent any type of one or more wired and/or wireless telecommunications networks. For example, network 110 can represent the Internet and/or one or more telephone networks, one or more cellular networks, one or more LANs, etc. In some implementations, computing devices, such as, for example, registrars 132, 134, 140, and 150 can connect to, for example, registry 120 via network 110. In further implementations, registrars 140 and 150 can connect to, for example, resource allocation server 160 via network 110.

In some embodiments, registry 120 can represent one or more computing devices. For example, registry 120 can represent one or more database servers, web servers, mainframe computers, etc. used to provide a domain name registry service. In some embodiments, registry 120 can maintain an up-to-date database of domain name records. Accordingly, registry 120 can receive DNS requests (e.g., domain names) and provide DNS responses (e.g., IP addresses). In further implementations, registry 120 can delete expiring domain name records and register new domain names when no record exists for a domain name in an add request.

In some implementations, registrars 132, 134, 140, and 150 can each represent one or more computing devices. For example, registrars 132, 134, 140, and 150 can represent database servers, web servers, mainframe computers, etc. used to provide domain name registrar services. In some embodiments, a registrar can be accredited by a registry (e.g., registry 120) and/or ICANN to manage the reservation of domain names with the registry. Accordingly, a registrar can receive requests to register domain names from end users, and send add requests to the registry to attempt to register the domain names. Additionally, in some implementations, registrars 132, 134, 140, and 150 can offer a service of registering newly deleted domain names. Accordingly, when end users request an expiring domain name, registrars 132, 132, 140, and 150 can send repeated add requests to registry 120 in an attempt to capture the domain name.

As shown in FIG. 1, for the sake of example, each of registrars 132, 134, 140, and 150 have four resources (e.g., channels) for communicating with registry 120. Accordingly, each registrar can send no more than four simultaneous add requests.

As further shown in FIG. 1, for the sake of example, registrars 132 and 134 are within box 130, representing that registrars 132 and 134 are owned and/or controlled by a single entity (e.g., a single organization). Conversely, registrars 140 and 150 are owned and/or controlled by different entities.

As additionally shown in FIG. 1, registrars 140 and 150 can communicate with resource allocation server 160. In some embodiments, resource allocation server 160 can be associated with and/or part of registry 120.

Resource allocation server 160 can represent one or more computing devices. For example, resource allocation server 160 can represent a database server, web server, mainframe computer, etc. used to provide a resource allocation service. In various embodiments, resource allocation service 160 can, for example, manage available time windows for available domain name acquisition resources during a batch delete period and transmit communications to registrars instructing the registrars to send add requests for specific domain names to registry 120 during specific time windows during a batch delete period.

Accordingly, for example, if registrar 140 receives a request from an end user to capture an expiring domain name, registrar 140 can communicate with resource allocation server 160 to utilize available acquisition resources of registrar 150 during the time window of a batch delete period during which the desired domain name is expected to be deleted by registry 120. Thus, registrar 140 has an increased chance of capturing the desired domain name, even if the entity associated with box 130 is using all available resources of registrars 132 and 134 in an attempt to capture the same domain name.

The schematic depicted in FIG. 1 is merely for the purpose of illustration and is not intended to be limiting. Further, the DNS depicted is merely a simplified example of a DNS, consistent with certain disclosed embodiments, but such an example is not intended to be limiting. For example, in various embodiments, the DNS can include additional networks, servers, computers, registries, registrars, resource allocation servers, and/or other devices. Additionally, the described devices can be separate devices, as pictured, or various devices can be combined, consistent with certain disclosed embodiments. For example, in some embodiments the resource allocation server can be part of and/or associated with registry 120.

Figure 2:
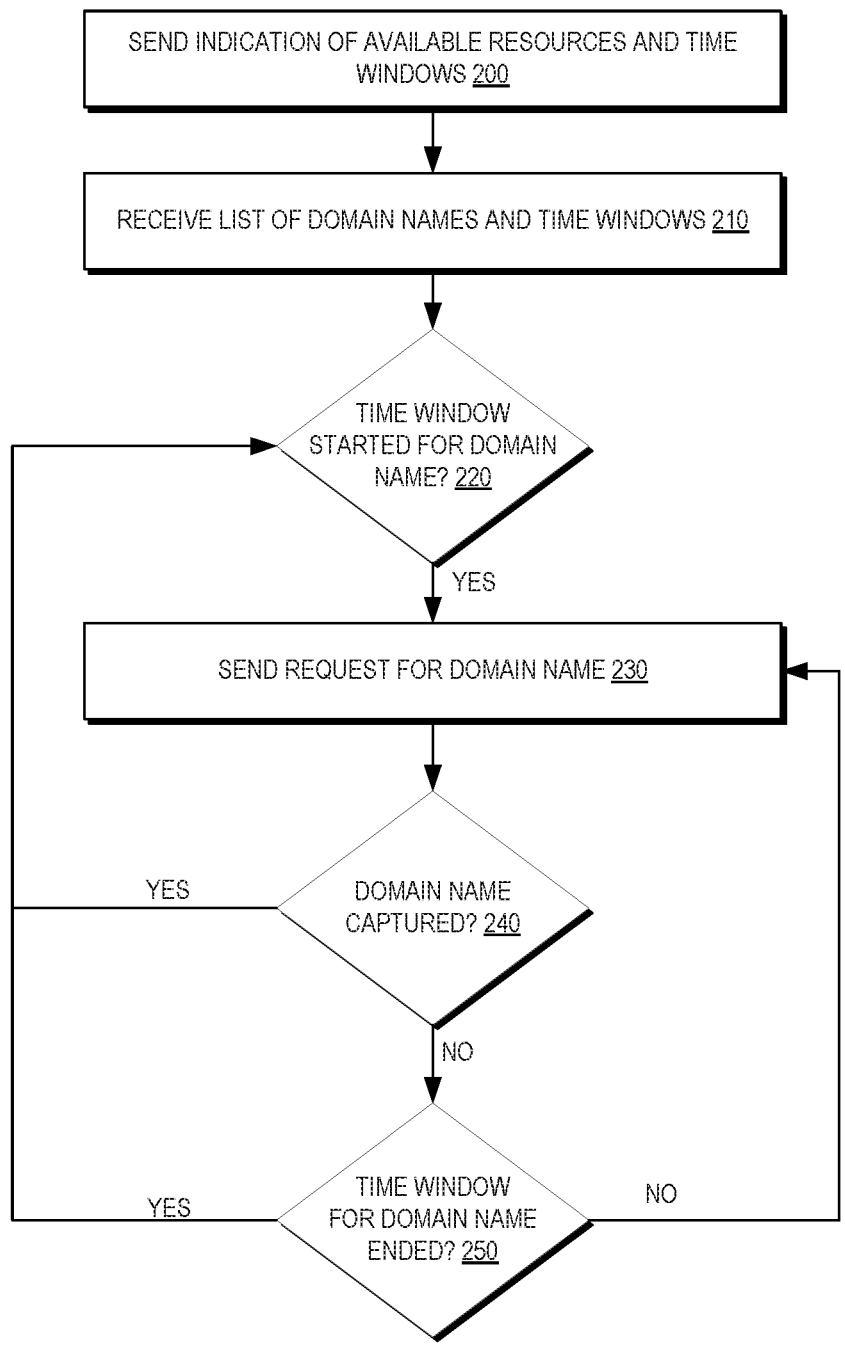
FIG. 2 is a flow diagram illustrating an example process for providing domain name acquisition resources from an available registrar, consistent with certain disclosed embodiments.

FIG. 2 is a flow diagram illustrating an example process for providing domain name acquisition resources from an available registrar, consistent with certain disclosed embodiments. In some embodiments, the method described in FIG. 2 can be performed using a computing device or one or more computing devices such as, for example, a database server, a web server, a mainframe computer, a desktop computer, a laptop, a smartphone, etc. For example, the method described in FIG. 2 can be performed by one or more of registrars 132, 134, 140, and 150 in FIG. 1.

In some embodiments, the computing device can be running a domain name acquisition resource allocation program that is associated with a domain name acquisition resource allocation service. For example, the resource allocation program can be provided by the resource allocation service to the computing device.

The process can begin in 200, when the computing device sends an indication of available domain name acquisition resources and time windows the resources are available to a resource allocation server (e.g., resource allocation server 160 in FIG. 1). In some embodiments, the computing device can be accredited with a domain name registry and/or ICANN, which can result in the computing device have one or more resources (e.g., channels) available for use as domain name acquisition resources. Using the resources, the computing device can send domain name add requests to the domain name registry, which can be successful if the domain name is not currently registered (i.e., a domain name record does not already exist at the registry). As discussed above, the domain name acquisition resources can be particularly useful during a batch delete period of the domain name registry.

During a batch delete, the computing device may have one or more resources that are not scheduled for use during some or all of the batch delete period. Accordingly, to avoid wasting useful (and valuable) resources during a batch delete, the computing device can send the indication of the resources that are available and the time windows the resources will be available. For example, if the computing device is scheduled to attempt to register a domain name that is at the beginning of the batch delete period using a particular resource, the resource may be in use during the first minute of the batch delete, but available for the reminder of the batch delete period. Accordingly, the computing device can send an indication that the resource is available for the second minute of the batch delete period until the end of the batch delete period.

In various embodiments, the indication of available resources and time windows the resources are available can be sent automatically using the resource allocation program. For example, add request schedules during a batch delete period for each available resource can be input into the resource allocation program, and the resource allocation can determine available resources and time windows and automatically send the information to the resource allocation server.

In some implementations, the indication that is sent to the resource allocation server can also include, for example, a name of the computing device, an indication of the available bandwidth the computing device has for each resource, a price for using the available resources (e.g., a price per minute), etc.

In 210, the computing device can receive, from the resource allocation server, a communication (e.g., a list and/or a file) that includes indications of domain names and time windows for one or more of the resources that were indicated to be available in 200. In some embodiments, the list of domain names and time windows can be a schedule of domain names and time windows to request the domain names. For example, each domain name can be associated with a starting millisecond and an ending millisecond after the start of the batch delete period during which to request the domain name.

In further embodiments, the list of domain names can be a file that can activate and/or be processed by the resource allocation program and can, for example, cause the registrar to enable connections to a domain name registry over the Internet and automatically send repeated add requests for domain names in the file according to a schedule of domain names and time windows. In other embodiments, the list of domain names and time windows can be a textual list of the domain names and time windows for requesting the domain names.

In some implementations, the list of domain names can be generated by the resource allocation server, as discussed in further detail below with regard to FIG. 3.

In 220, the computing device can determine whether a time window has started for requesting a domain name. In some embodiments, the computing device can automatically determine whether a time window has started for requesting a domain name using the resource allocation program. For example, the resource allocation program can process the file received from the resource allocation server in 210 and determine, based on the schedule, the domain names and time windows for requesting the domain name. The computing device can determine if a time window has started using a clock of the computing device.

In further embodiments, the domain names from the list received in 210 can be entered into a program and/or scheduler that requests the domain names during the specified time window.

In various embodiments, the computing device can add the list of domain names and time windows received in 210 to an existing list of domain names that are scheduled to be requested during a batch delete period or the computing device can add additional domain names to be requested to the list of domain names and time windows received in 210.

If, in 220, the time window has not started, the process can remain at 220, and 220 can be repeated until a time window for a domain name starts. If, in 220, the time window has started for a domain name, the process can proceed to 230.

In 230, since the time window for requesting a domain name has started, the computing device can send an add request for the domain name to a domain name registry using the available resource.

In 240, the computing device can determine if the add request was successful (i.e., the domain name was captured). For example, the computing device can receive a response from the domain name registry (e.g., a confirmation response or a failure response), the computing device can check the status of the domain name after sending a preset number of add requests for the domain name, or the computing device can determine that a predetermined amount of time has passed.

If, in 240, the computing device determines that the domain name was not captured (e.g., a failure response is received or the predetermined amount of time passed) the process can proceed to 250.

If, in 240, the computing device determines that the domain name was captured (e.g., a confirmation response), the process can return to 220 and the computing device can determine if a time window has started for another domain name. Alternately, in some embodiments, once a current domain name is captured, the computing device can automatically begin sending requests for a subsequent domain name in the list and/or automatically based on the file, even if the time window for the subsequent domain name has not started.

In 250, the computing device can determine if the time window for requesting the domain name has ended. For example, the computing device can determine if a time window has ended using the clock of the computing device.

If, in 250, the computing device determines that the time window has ended, the process can return to 220 and the computing device can determine if a time window has started for another domain name.

If, in 250, the computing device determines that the time window has not ended, the process can return to 230, and the computing device can send another add request for the domain name to the domain name registry using the available resource. Accordingly, the computing device can repeatedly and/or continuously attempt to capture the domain name during the time window.

While the steps depicted in FIG. 2 have been described as performed in a particular order, the order described is merely an example, and various different sequences of steps can be performed, consistent with certain disclosed embodiments. For example, in some embodiments, the computing device may not determine if the domain name has been captured in 240 because by the time a response is received (e.g., 5 seconds), in some instances, the batch delete period may have already ended. Accordingly, the computing device may continuously attempt to capture the domain name during the time window regardless of whether the domain name has already been captured by the computing device during the time window. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
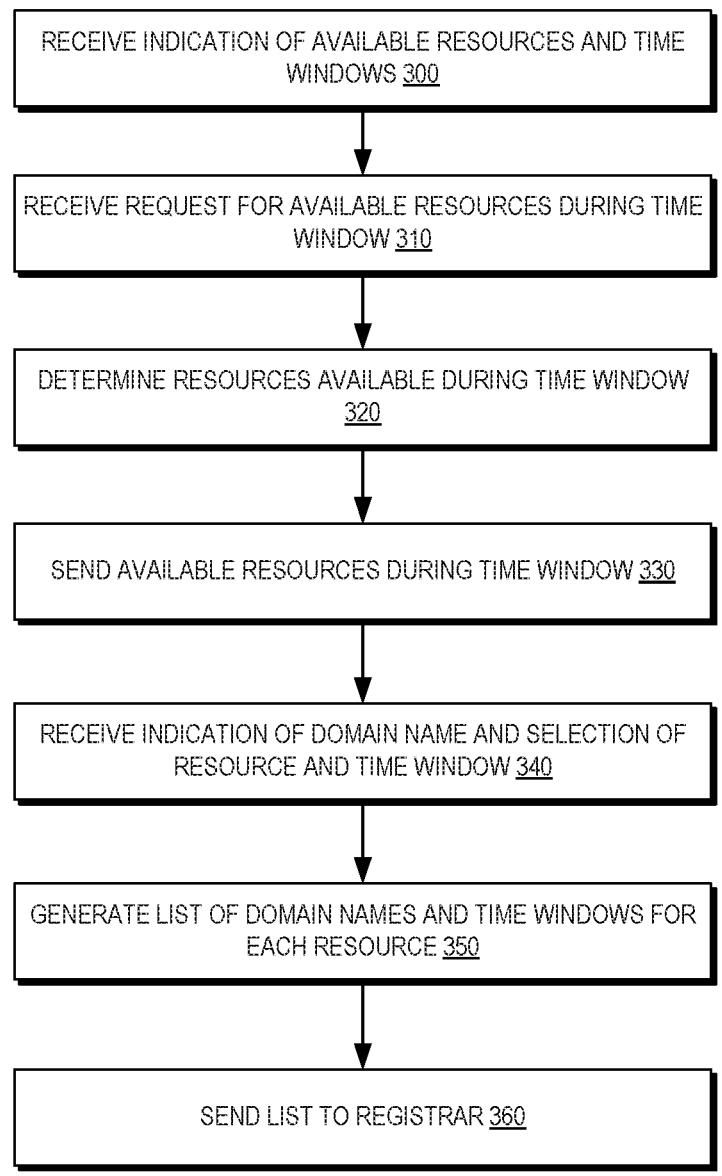
FIG. 3 is a flow diagram illustrating an example process for dynamically allocating domain name acquisition resources, consistent with certain disclosed embodiments.

FIG. 3 is a flow diagram illustrating an example process for dynamically allocating domain name acquisition resources, consistent with certain disclosed embodiments. In some embodiments, the method described in FIG. 3 can be performed using a computing device or one or more computing devices such as, for example, a database server, a web server, a mainframe computer, a desktop computer, a laptop, a mobile device, etc. For example, the method described in FIG. 3 can be performed by resource allocation server 160 in FIG. 1.

In some implementations, the computing device can be configured to provide a resource allocation service. In additional or alternative embodiments, the computing device can be a domain name registry and/or can be associated with a domain name registry (e.g., registry 120 in FIG. 1). In other embodiments, the computing device can be a service that is separate from a domain name registry.

The process can begin in 300, when the computing device receives an indication of available domain name acquisition resources and time windows the resources are available from a registrar (e.g., registrars 132, 134, 140, or 150 in FIG. 1). In some embodiments, the registrar can be accredited with a domain name registry and/or ICANN, which can result in the registrar have one or more resources (e.g., channels) available for use to request domain names during a batch delete period.

In various embodiments, 300 can be performed repeatedly each time an indication of available resources and time windows is received, and the indication can be received from multiple registrars. Accordingly, 300 can be performed multiple times before 310 occurs and/or, in some embodiments, 310 can occur prior to 300.

In some embodiments, the indications can be received from multiple registrars, and the computing device can store associations between the registrars, the available resources, and the time windows.

In some implementations, the received indications can also include, for example, a name of the registrars, indications of the available bandwidth a registrar has for each resource, a price for using the available resources (e.g., a price per minute), etc. In such embodiments, the computing device can additionally store and associate the additional information with the registrars, the available resources, and the time windows.

In 310, the computing device can receive a request for available domain name acquisition resources from a device, such as a registrar (e.g., registrars 132, 134, 140, or 150 in FIG. 1). In some embodiments, the request can be for available resources during a requested time window. In further embodiments, the requested time window can be during an upcoming batch delete period of a domain name registry. In some implementations, the request can also include a number of resources needed, a maximum price (e.g., a maximum price per minute), a minimum bandwidth needed, etc.

In some implementations, the request can be received from a registrar or other device that is scheduled to attempt to capture a domain name that will be deleted in an upcoming batch delete period, and the device can be attempting to increase the device's chances of capturing the domain name.

In further implementations, the request can be received via a web browser interface, as shown and described with regard to FIG. 5, below.

In 320, the computing device can determine a list of domain name acquisition resources that are available during the requested time window. For example, the computing device can search the stored associations between the registrars, the available resources, and the time windows (e.g., based on the indications received in 300), and determine which resources have available time windows that are within the requested time window. Additionally, in further embodiments, the computing device can also search for resources that match additional specified requirements, such as, for example, resources that are associated with a price that is less than or equal to a specified price and/or resources that are associated with a bandwidth that is greater than or equal to a specified bandwidth.

In 330, the computing device can send a list of available domain name acquisition resources to the device that sent the request in 310. For example, the indications can be sent via the web browser interface.

In some embodiments, the computing device can additionally send, for example, indications of the names of the registrars with available resources, a number of resources available for each registrar, the bandwidth available for each registrar, and a price for using the resources of a registrar.

In various embodiments, the web browser interface can display, for example, the names of the registrars with available resources, a number of resources available for each registrar, the bandwidth available for each registrar, and a price for using the resources of a registrar.

In various embodiments, 310-330 can be performed repeatedly each time a request for an available resource is received, and the requests can be received from multiple devices. For example, a device attempting to capture a domain name may search different time windows and/or use different criteria before actually selecting resources. Accordingly, 310-330 can be performed multiple times before 340 occurs.

In 340, the computing device can receive an indication of a selection of one or more available domain name acquisition resources, an indication of a domain name, and an indication of the specified time window for requesting the domain name. For example, the selection of available resources and the indication of the domain name can be received via the web browser interface.

In various embodiments, 310-340 can be performed each time a request for an available resource is received and then an indication of a selection is received, and the requests and selections can be received from multiple devices. Accordingly, 310-340 can be performed multiple times before 350 occurs.

In 350, the computing device can generate a communication that includes, for each resource, a list of domain names and a time window for requesting each domain name. The list can be based on the selection(s) received in 340. In some embodiments, the communication can be a schedule of domain names to request based on specified time windows. For example, the communication can be a file that can be processed by a resource allocation program, and the file can cause the registrar to automatically send repeated add requests for the domain names to a domain name registry based on the schedule. In other embodiments, the list of domain names and times can be a textual list and/or schedule of the domain names and time windows for requesting the domain names.

In 360, communication can be sent to the registrar associated with the resource. In various embodiments, the communication can be used and/or can result in the registrar sending multiple requests for domain names to a domain name registry during the specified time windows.

In various embodiments, communications can be sent to multiple registrars (e.g., some or all of the registrars that sent indications in 300), where each communication has at least one domain name and one time window for requesting the domain name.

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
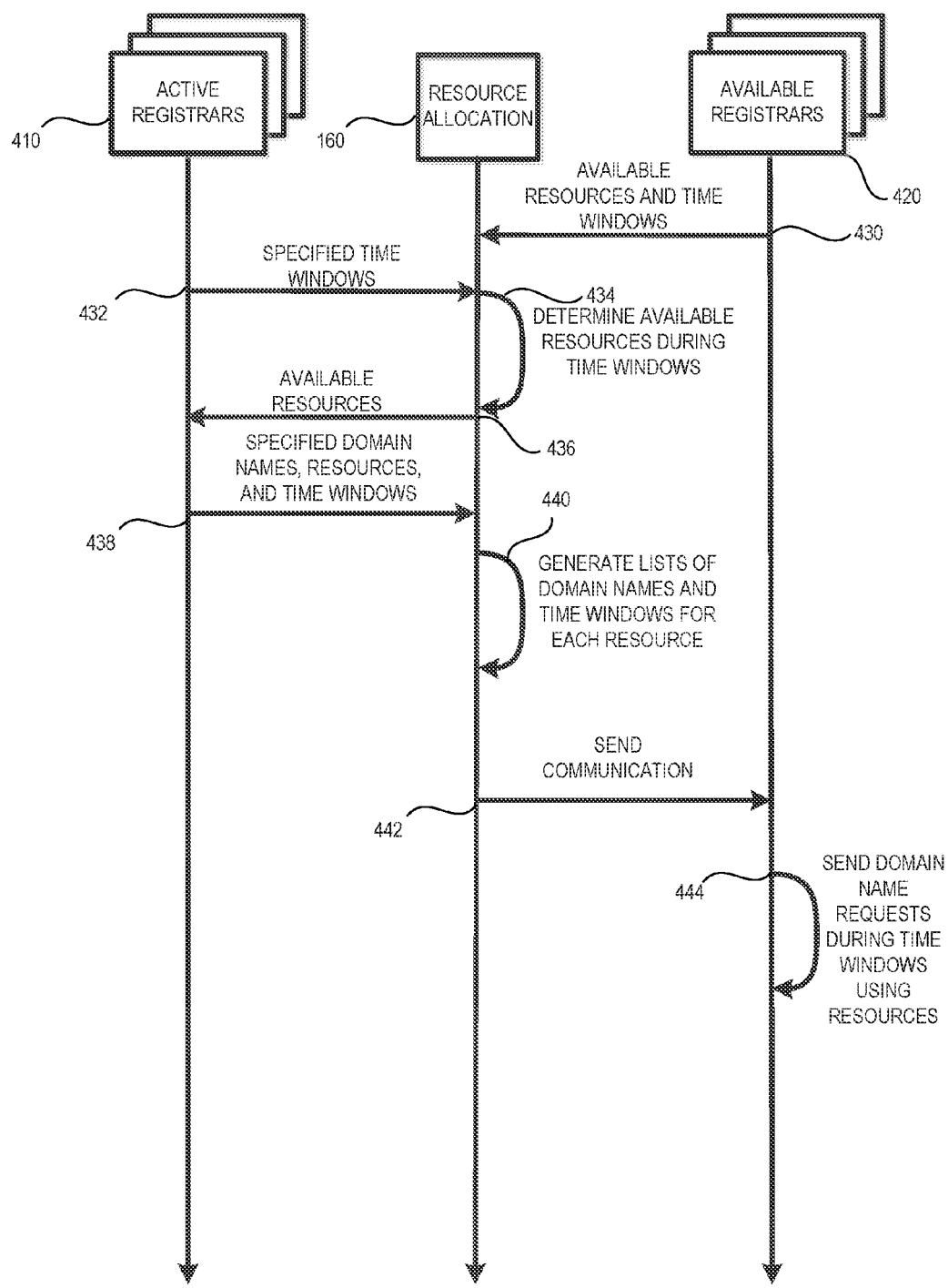
FIG. 4 is a flow diagram illustrating example communications prior to a DNS batch delete period, consistent with certain disclosed embodiments.

FIG. 4 is a flow diagram illustrating example communications prior to a DNS batch delete period, consistent with certain disclosed embodiments. In some embodiments, communications can occur between, at least, a resource allocation server (e.g., resource allocation server 160 in FIG. 1), multiple active registrars 410 (i.e., registrars or other devices seeking to capture a domain name during the batch delete period), multiple available registrars 420 (i.e., registrars that have resources at least partially available during the batch delete period, and a registry (not pictured).

In 430, one or more of the available registrars 420 can send indications of available resources, time windows, and additional information (e.g., 200 in FIGS. 2 and 300 in FIG. 3). 430 can occur repeatedly, with indications coming from different registrars at different times, and resource allocation server 160 can store associations between the registrars, the available resources, the time windows, and the additional information.

In 432, one or more of the active registrars 410 can send, to resource allocation server 160, requests for available resources during specified time windows and/or based on additional criteria. (e.g., 310 in FIG. 3).

In response, in 434, resource allocation server can determine the available resources that match the criteria (e.g., 320 in FIG. 3), and, in 436, can send a response that indicates the available resources and/or additional information about the resources to the requesting active registrar (e.g., 330 in FIG. 3).

432-436 can occur repeatedly, with requests coming from different registrars (or other devices) at different times.

In 438, one or more of the active registrars 410 can send, to resource allocation server 160, an indication of at least one domain name to be captured, at least one resource, and at least one time windows for attempting to capture the at least one domain name (e.g., 340 in FIG. 3). 438 can occur repeatedly, with indications and selections coming from different registrars (or other devices) at different times, and resource allocation server 160 can store associations between the domain names, the active registrar, the resource, and the time window.

In 440, the resource allocation server can generate one or more communications including lists of at least one domain name and at least one time window for each resource that was selected in 438 (e.g., 350 in FIG. 3). 440 can be performed in response to 438, can be performed in batches, and/or can be performed at a specific time prior to the batch delete period.

In 442, after the generation of one or more communications, the communications can be sent to the one or more available registrars 420 (e.g., 210 in FIG. 2 and 360 in FIG. 3).

In 444, during the batch delete period, the available registrars 420 can send domain name requests based on the communications received in 442 to a registry (not pictured) (e.g., 220-250 in FIG. 2).

While the steps depicted in FIG. 4 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Additionally, the devices depicted in FIG. 4 are merely for the purpose of illustration and are not intended to be limiting. Further, the described devices can be separate devices, as pictured, or various devices can be combined, consistent with certain disclosed embodiments.

FIG. 5 is a diagram illustrating an example interface for allocating domain name acquisition resources, consistent with certain disclosed embodiments. In some embodiments, interface 500 can represent a web browser interface or any other type of software application for retrieving and presenting information via a network connection (e.g., via the Internet). The web browser interface can be utilized by a device, such as any of registrars 132, 134, 140, and 150 in FIG. 1 and registrars 410 and 420 in FIG. 4.

In some implementations, a user can input a Uniform Resource Locator (URL) into interface 500 to retrieve the code, script, etc. for displaying the information shown in FIG. 5. As shown in FIG. 5, the displayed information can be used by an active registrar (i.e., a registrar or other device that will attempt to capture a domain name during a subsequent batch delete period).

In some embodiments, interface 500 can include inputs 510, for the user to specify criteria for available resources to be used for capturing a domain name. As shown in FIG. 5, the input criteria can include, for example, a date of the batch delete period, a time window start time (e.g., in milliseconds from the start of the batch delete period), a time window end time (e.g., in milliseconds from the start of the batch delete period), a number of resources to be used, and a maximum price for using the resource. In various embodiments, the information received via inputs 510 can represent the information received by a resource allocation server (e.g. resource allocation sever 160 in FIG. 1) in 310 in FIG. 3 and/or 432 in FIG. 4.

In further embodiments, interface 500 can include displayed information 520, which can display for the user the available resources for capturing a domain name and additional information. As shown in FIG. 5, the displayed information can include the names of registrars with available resources, the number of available resources (e.g., channels for requesting domain names), the bandwidth available for requesting domain names, and the price for using a resource. In various embodiments, the information displayed in 520 can represent the information sent by the resource allocation server in 330 in FIG. 3 and/or 436 in FIG. 4.

The interface depicted in FIG. 5 is merely for the purpose of illustration and is not intended to be limiting. For example, different styles or formats can be utilized, less or more information can be input and/or displayed, and additional functionalities or features can be available, consistent with certain disclosed embodiments.

Figure 6:
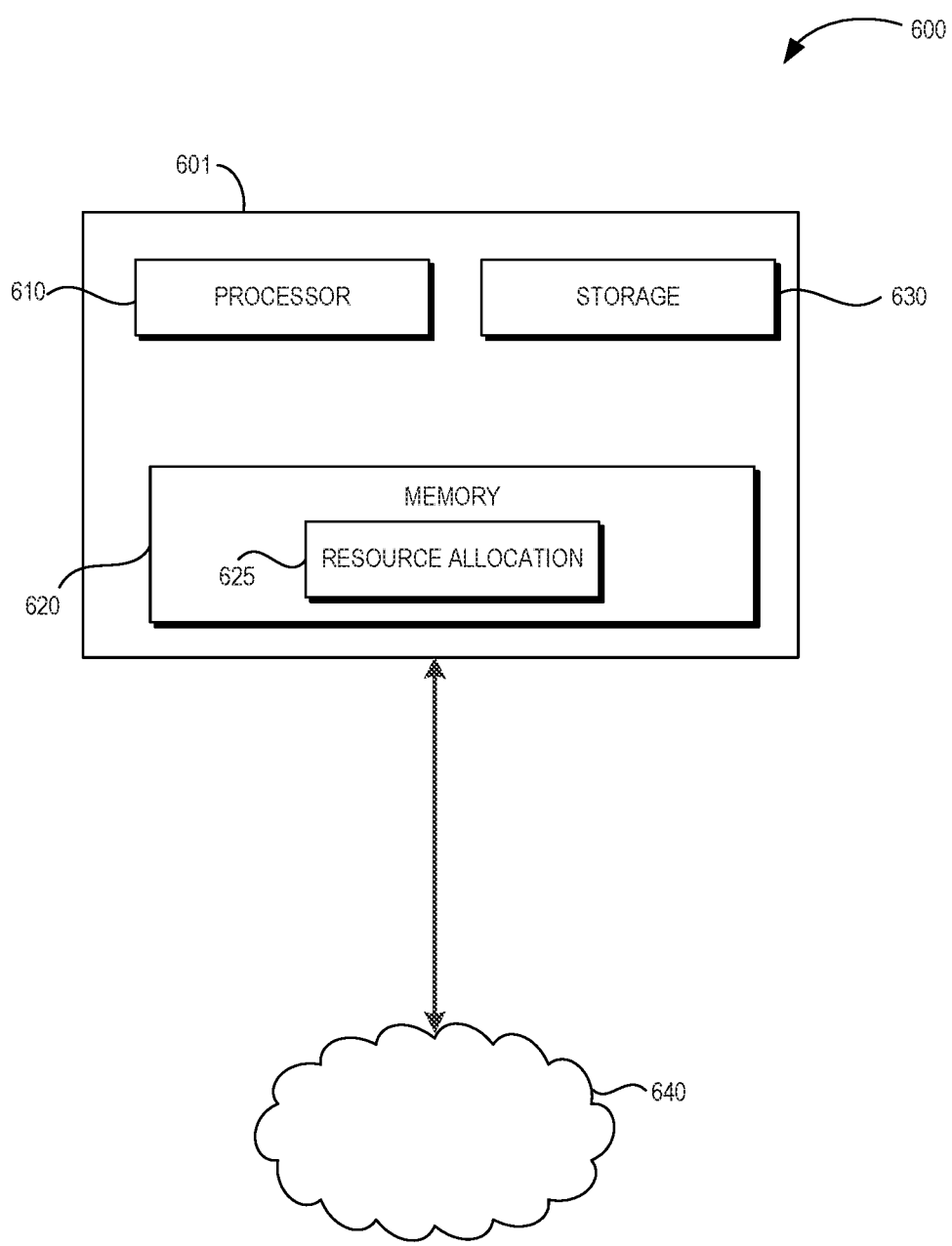
FIG. 6 is a diagram illustrating an example of a hardware system for dynamically allocating domain name acquisition resources, consistent with certain disclosed embodiments.

FIG. 6 is a diagram illustrating an example of a hardware system for dynamically allocating domain name acquisition resources, consistent with certain disclosed embodiments. An example hardware system 600 includes example system components that may be used. The components and arrangement, however, may be varied.

Computer 601 may include processor 610, memory 620, storage 630, and input/output (I/O) devices (not pictured). The computer 601 may be implemented in various ways and can be configured to perform any of the embodiments described above. In some embodiments, computer 601 can be a computer of an end user such as, for example, a desktop computer, a laptop, a tablet device, a mobile device (e.g., a smartphone), etc. In other embodiments, computer 601 can be a computing device such as, for example, a database server, a web server (e.g., a domain name registrar), a mainframe computer, etc. For example, computer 601 can be registrars 132, 134, 140, and/or 150 in FIG. 1, registrars 410 and/or 420 in FIG. 4, and/or resource allocation server 160 in FIGS. 1 and 4. Computer 601 may be standalone or may be part of a subsystem, which may, in turn, be part of a larger system.

The processor 610 may include one or more known processing devices, such as a microprocessor from the Intel Core™ family manufactured by Intel™, the Phenom™ family manufactured by AMD™, or the like. Memory 620 may include one or more storage devices configured to store information and/or instructions used by processor 610 to perform certain functions and operations related to the disclosed embodiments. Storage 630 may include a volatile or non-volatile, magnetic, semiconductor, tape, optical, removable, non-removable, or other type of computer-readable medium used as a storage device. In some embodiments, storage 630 can include, for example, associations between registrars, resources, and time windows, lists of domain names and time windows, etc.

In an embodiment, memory 620 may include one or more programs or subprograms including instructions that may be loaded from storage 630 or elsewhere that, when executed by computer 601, perform various procedures, operations, or processes consistent with disclosed embodiments. For example, memory 620 may include resource allocation program 625 for providing resources from an available registrar, dynamically allocating domain name acquisition resources, etc., according to various disclosed embodiments. Memory 620 may also include other programs that perform other functions, operations, and processes, such as programs that provide communication support, Internet access, etc. The resource allocation program 625 may be embodied as a single program, or alternatively, may include multiple subprograms that, when executed, operate together to perform the function of the resource allocation program 625 according to disclosed embodiments. In some embodiments, resource allocation program 525 can perform all or part of the processes of FIGS. 2-4, described above.

Computer 601 may communicate over a link with network 640. For example, the link may be a direct communication link, a local area network (LAN), a wide area network (WAN), or other suitable connection. Network 640 may include the internet, as well as other networks, which may be connected to various systems and devices.

Computer 601 may include one or more input/output (I/O) devices (not pictured) that allow data to be received and/or transmitted by computer 601. I/O devices may also include one or more digital and/or analog communication I/O devices that allow computer 601 to communicate with other machines and devices. I/O devices may also include input devices such as a keyboard or a mouse, and may include output devices such as a display or a printer. Computer 601 may receive data from external machines and devices and output data to external machines and devices via I/O devices. The configuration and number of input and/or output devices incorporated in I/O devices may vary as appropriate for various embodiments.

Example uses of the system 600 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system for dynamically allocating domain name acquisition resources, comprising:
   a processing system of a device comprising one or more processors; and
   a memory system comprising one or more computer-readable media, wherein the one or more computer-readable media contain instructions that, when executed by the processing system, cause the processing system to perform operations comprising:
      receiving an indication of an available domain name acquisition resource and an available time window from a registrar;
      receiving, from a device, a request for available domain name acquisition resources during a requested time window, wherein the available time window is within the requested time window;
      determining a list of domain name acquisition resources available during the requested time window, wherein the list comprises the available domain name acquisition resource indicated by the registrar;
      transmitting, to the device, the list of available domain name acquisition resources;
      receiving, from the device, a selection of the available domain name acquisition resource from the list, a specified time window within the available time window, and an indication of a domain name to request during the specified time window;
      generating a communication comprising an indication of the domain name to request during the specified time window; and
      transmitting the communication to the registrar, wherein the communication results in the registrar sending a plurality of requests for the domain name to a domain name registry during the specified time window.

2. The system of claim 1, wherein the specified time window is during a batch delete period of a domain name registry.

3. The system of claim 1, wherein the indication of the available domain name acquisition resource and the available time window further comprises indications of one or more of a name of the registrar, a number of domain name acquisition resources available, an available bandwidth for requesting domain names, and a price for requesting domain names.

4. The system of claim 1, wherein the request for available domain name acquisition resources is received via a web interface.

5. The system of claim 1, wherein:
   the device is a plurality of devices;
   each device of the plurality of devices provides a selection of a domain name acquisition resource, a specified time window, and an indication of a domain name to request during the specified time window; and
   the communication comprises a plurality of indications of domain names to request, each domain name associated with a specified time window.

6. The system of claim 5, wherein:
   the registrar is a plurality of registrars;
   the communication comprises a plurality of communications; and
   transmitting the communication to the registrar comprises transmitting each communication of the plurality of communications to a registrar of the plurality of registrars.

7. The system of claim 5, wherein the communication comprises a schedule of domain names to request based on the specified time windows.

8. The system of claim 7, wherein the communication comprises a file that causes the registrar to automatically send repeated add requests for a domain name, based on the schedule of domain names, to the domain name registry.

9. The system of claim 8, wherein the file further causes the registrar to begin requesting a subsequent domain name in the schedule based on at least one of capturing a previous domain name in the schedule or a time window for the previous domain name ending.

10. The system of claim 1, wherein:
the indication of the available domain name acquisition resource and the available time window from the registrar is received via a domain name acquisition resource allocation program running on the registrar; and
the domain name acquisition resource allocation program is associated with a domain name acquisition resource allocation service.

11. The system of claim 1, wherein:
the domain name acquisition resource allocation service is associated with the domain name registry.

12. A computer-implemented method for dynamically allocating domain name acquisition resources, comprising:
receiving an indication of an available domain name acquisition resource and an available time window from a registrar;
receiving, from a device, a request for available domain name acquisition resources during a requested time window, wherein the available time window is within the requested time window;
determining a list of domain name acquisition resources available during the requested time window, wherein the list comprises the available domain name acquisition resource indicated by the registrar;
transmitting, to the device, the list of available domain name acquisition resources;
receiving, from the device, a selection of the available domain name acquisition resource from the list, a specified time window within the available time window, and an indication of a domain name to request during the specified time window;
generating, using one or more processors, a communication comprising an indication of the domain name to request during the specified time window; and
transmitting the communication to the registrar, wherein the communication results in the registrar sending a plurality of requests for the domain name to a domain name registry during the specified time window.

13. The method of claim 12, wherein:
the device is a plurality of devices;
each device of the plurality of devices provides a selection of a domain name acquisition resource, a specified time window, and an indication of a domain name to request during the specified time window; and
the communication comprises a plurality of indications of domain names to request, each domain name associated with a specified time window.

14. The method of claim 13, wherein the communication comprises a schedule of domain names to request based on the specified time windows.

15. The method of claim 14, wherein the communication comprises a file that causes the registrar to automatically send repeated add requests for a domain name, based on the schedule of domain names, to the domain name registry.

16. The method of claim 15, wherein the file further causes the registrar to begin requesting a subsequent domain name in the schedule based on at least one of capturing a previous domain name in the schedule or a time window for the previous domain name ending.

17. A non-transitory computer readable storage medium for dynamically allocating domain name acquisition resources, the non-transitory computer readable storage medium comprising instructions for causing one or more processors to perform a method comprising:
receiving an indication of an available domain name acquisition resource and an available time window from a registrar;
receiving, from a device, a request for available domain name acquisition resources during a requested time window, wherein the available time window is within the requested time window;
determining a list of domain name acquisition resources available during the requested time window, wherein the list comprises the available domain name acquisition resource indicated by the registrar;
transmitting, to the device, the list of available domain name acquisition resources;
receiving, from the device, a selection of the available domain name acquisition resource from the list, a specified time window within the available time window, and an indication of a domain name to request during the specified time window;
generating a communication comprising an indication of the domain name to request during the specified time window; and
transmitting the communication to the registrar, wherein the communication results in the registrar sending a plurality of requests for the domain name to a domain name registry during the specified time window.

18. The non-transitory computer readable storage medium of claim 17, wherein:
the device is a plurality of devices;
each device of the plurality of devices provides a selection of a domain name acquisition resource, a specified time window, and an indication of a domain name to request during the specified time window; and
the communication comprises a plurality of indications of domain names to request, each domain name associated with a specified time window.

19. The non-transitory computer readable storage medium of claim 18, wherein the communication comprises a schedule of domain names to request based on the specified time windows.

20. The non-transitory computer readable storage medium of claim 19, wherein the communication comprises a file that causes the registrar to automatically send repeated add requests for a domain name, based on the schedule of domain names, to the domain name registry.

21. The non-transitory computer readable storage medium of claim 20, wherein the file further causes the registrar to begin requesting a subsequent domain name in the schedule based on at least one of capturing a previous domain name in the schedule or a time window for the previous domain name ending.

* * * * *